(12) United States Patent
Mizuno (10) Patent No.: US 7,023,609 B2
(45) Date of Patent: Apr. 4, 2006

(54) ELECTROPHORETIC DISPLAY APPARATUS

(75) Inventor: Hiroshi Mizuno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/226,814

(22) Filed: Sep. 13, 2005

(65) Prior Publication Data

US 2006/0007529 A1   Jan. 12, 2006

Related U.S. Application Data

(63) Continuation of application No. 10/858,248, filed on Jun. 1, 2004.

(30) Foreign Application Priority Data

Jun. 2, 2003   (JP) ............................. 2003-157147

(51) Int. Cl.
*G02B 26/00*   (2006.01)
*G02F 1/03*    (2006.01)
*G02F 1/48*    (2006.01)
*G09G 3/34*    (2006.01)

(52) U.S. Cl. ...................... 359/296; 359/245; 345/107; 204/600

(58) Field of Classification Search ................ 359/296, 359/245, 265; 345/107, 105, 108; 204/600, 204/616, 471; 445/24, 58
See application file for complete search history.

(56) References Cited

U.S. PATENT DOCUMENTS

| 3,756,693 | A  | * | 9/1973 | Ota ............................. 345/107 |
| 6,750,844 | B1 | * | 6/2004 | Nakanishi .................... 345/107 |
| 6,873,451 | B1 |   | 3/2005 | Ukigaya ...................... 359/296 |
| 2002/0018043 | A1 |   | 2/2002 | Nakanishe ................... 345/107 |
| 2004/0094422 | A1 | * | 5/2004 | Pullen et al. ................ 204/600 |
| 2004/0150613 | A1 | * | 8/2004 | Li et al. ...................... 345/107 |
| 2005/0012981 | A1 |   | 1/2005 | Miura et al. ................. 359/296 |

FOREIGN PATENT DOCUMENTS

| JP | 49-24695   | 3/1974 |
| JP | 9-185087   | 7/1997 |
| JP | 11-202804  | 7/1999 |

* cited by examiner

*Primary Examiner*—Loha Ben
(74) *Attorney, Agent, or Firm*—Morgan & Finnegan, L.L.P.

(57) ABSTRACT

An apparatus includes a transparent film substrate and a second substrate which are disposed opposite to each other with a spacing therebetween, a plurality of charged particles which are disposed in the spacing, a reflection layer having a thickness sufficient to scatter light transmitted through the first substrate and reflect the light toward the first substrate, a transparent first electrode disposed on the first substrate, and a second electrode for moving the charged particles between the first and second electrodes by applying a voltage between the first and second electrodes. Both of a position of the charged particles after being moved to the first electrode and a position of the charged particles after being moved to the second electrode are substantially apart from a surface of the reflection layer.

4 Claims, 6 Drawing Sheets

ELECTROPHORETIC DISPLAY APPARATUS

This is a continuation of application Ser. No. 10/858,248, filed Jun. 1, 2004.

FIELD OF THE INVENTION AND RELATED ART

The present invention relates to an electrophoretic display apparatus which effects by moving charged particles (electrophoretic particles).

In recent years, an electrophoretic display apparatus which effects display by moving charged particles, has received attention.

The electrophoretic display apparatus includes one of a so-called vertical movement type and one of a so-called horizontal movement type.

The vertical movement type electrophoretic display apparatus as described in Japanese Laid-Open Patent Application (JP-A) Hei 9-185087, includes a pair of substrates disposed with a predetermined spacing therebetween, and a dispersion medium and a plurality of charged particles disposed in the spacing between the substrates. In the electrophoretic display apparatus, switching is effected between a pixel electrode and an opposite electrode opposite to each other so that an electric field is generated in a vertical direction with respect to the substrates (the substrate thickness direction) to move the charged particles in a direction perpendicular to the substrates.

On the other hand, the horizontal movement type electrophoretic display apparatus has been proposed in JP-A Sho 49-24695.

As shown in FIGS. 6(a) and 6(b), the horizontal movement type electrophoretic display apparatus includes a pair of substrates 1a and 1b disposed with a predetermined spacing therebetween, and a dispersion medium 2 and charged particles 3 disposed in the spacing between the substrates 1a and 1b. Further, a pixel electrode 15a and an opposite electrode 15b are disposed on the same substrate side. In the electrophoretic display apparatus, an electric field in a horizontal direction (a direction along the substrate surface) is generated to move the charged particles 3 along the substrate.

Figure 6:
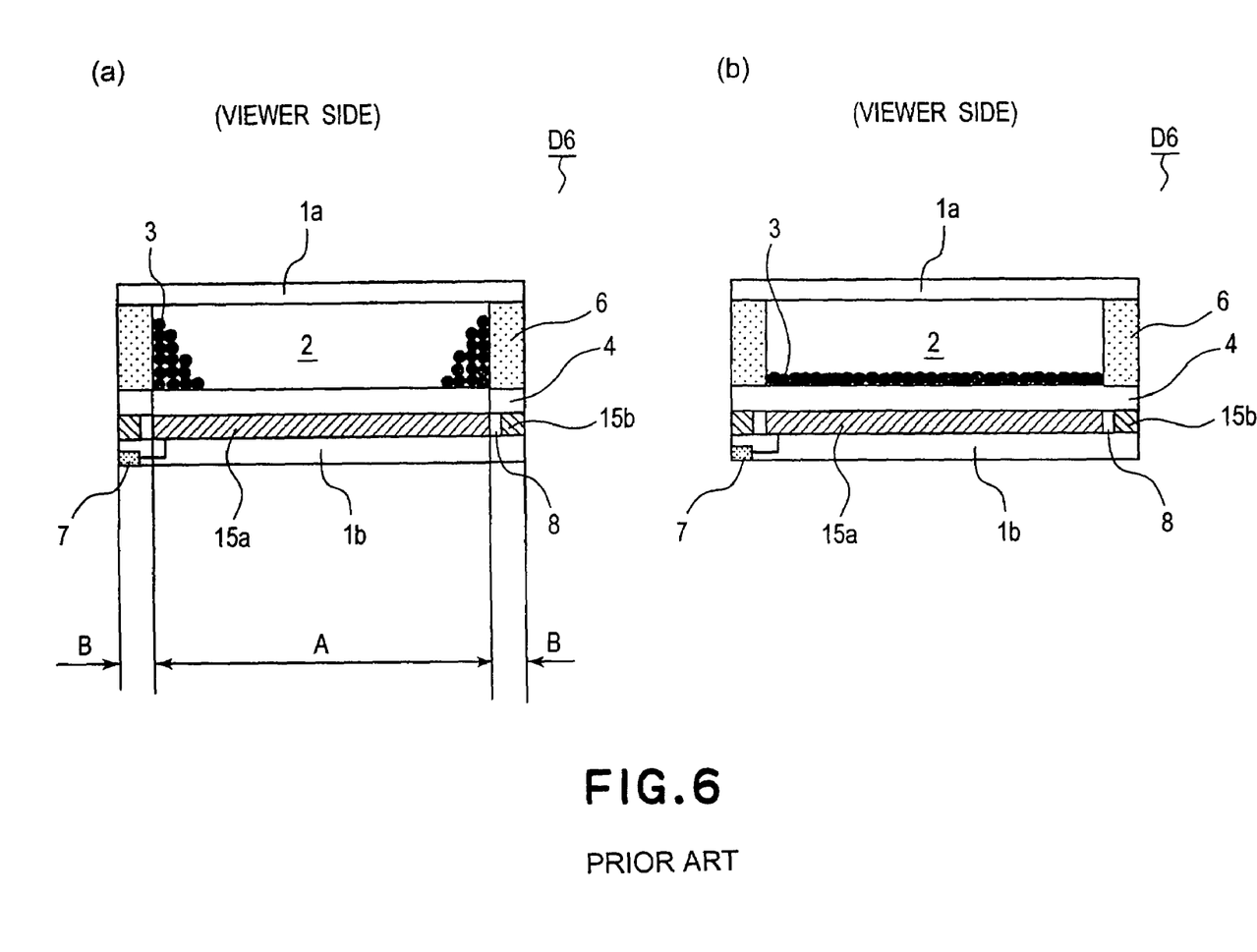
FIGS. 6(a) and 6(b) are respectively a sectional view showing an embodiment of a structure of a conventional electrophoretic display apparatus.

JP-A Hei 11-202804 has disclosed a reflection type display apparatus using such a horizontal movement type electrophoretic display device. The display apparatus, as shown in FIG. 6 includes a reflection layer 4 disposed so as to cover the electrodes 15a and 15b.

In the case of constituting a direct-view reflection type display device, as the reflection layer 4, a layer of a transparent insulating resin in which fine particles of a high reflective material are dispersed, is used. As the fine particles, particles of titanium oxide ($TiO_2$) or aluminum oxide ($Al_2O_3$) are suitably used. Further, as the transparent insulating resin, it is possible to use acrylic resin, urethane resin, fluorine-containing resin, norbornene resin, polycarbonate (PC), polyethylene terephthalate (PET), etc. Particularly, a reflection layer formed of a combination of titanium oxide and urethane resin is used as an optimum white scattering layer for the direct-view reflection type display device which displays a bright state by utilizing external light.

In such a direct-view reflection type display device, the thickness of the reflection layer 4 largely affects a display quality of bright state, such as a reflectance, so that the thickness of the reflection layer 4 is required to be thicker in order to improve the bright state display quality.

However, in the case where a material having a low dielectric constant is used in the reflection layer, an electrostatic capacity is created between a layer associated with electrophoresis and an electrode. As a result, a residual DC electric field is generated, so that a large loss of an electric field voltage (drive voltage) applied between the pixel electrode and the opposite electrode. Accordingly, when a voltage applied to the charged particles is kept at a value not less than a predetermined level, the drive voltage has to be increased. This problem is noticeable in the case where the reflection layer is made thicker in order to improve the bright state display quality.

SUMMARY OF THE INVENTION

An object of the present invention is to provide a display apparatus having solved the above problem.

According to the present invention, there is provided an apparatus, comprising:

a transparent film substrate and a second substrate which are disposed opposite to each other with a spacing therebetween, a plurality of charged particles which are disposed in the spacing, a reflection layer having a thickness sufficient to scatter light transmitted through the first substrate and reflect the light toward the first substrate, a transparent first electrode disposed on the first substrate, and a second electrode for moving the charged particles between the first and second electrodes by applying a voltage between the first and second electrodes, wherein both of a position of the charged particles after being moved to the first electrode and a position of the charged particles after being moved to the second electrode are substantially apart from a surface of the reflection layer.

This and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, embodiments of the present invention will be described with reference to the drawings.

An electrophoretic display apparatus D1 as an embodiment of the present invention, as shown in FIGS. 1(a) and 1(b), includes a first substrate 1a and a second substrate 1b disposed with a predetermined spacing, and a dispersion medium 2 and a plurality of charged particles (electrophoretic particles) 3 which are disposed in the spacing between these substrates 1a and 1b. At each pixel A (only one pixel is shown in FIGS. 1(a) and 1(b)), a reflection layer 4 is disposed on the second substrate 1b side (i.e., closer to the second substrate 1b on the basis of the dispersion medium 2), and a first electrode 5a and a second electrode 5b are disposed closer to the dispersion medium 2. Further, the first electrode 5a is disposed on the first substrate 1a side (i.e., closer to the first substrate 1a on the basis of the dispersion medium 2), and the second electrode 5b is disposed so that the reflection layer 4 is not sandwiched between the first and second electrodes 5a and 5b.

A voltage is applied between these electrodes 5a and 5b to cover the reflection layer 4 with the charged particles (FIG. 1(b)) or expose the reflection layer 4 (FIG. 1(a)), whereby display is effected.

More specifically, at the pixel where the charged particles 3 are collected in a narrow area by being attracted to the second electrode 5b (FIG. 1(a)), the reflection layer 4 is exposed and the color of pixel A is determined by reflected light from the reflection layer 4. On the other hand, at the pixel where the charged particles 3 is disposed (dispersed) in a broad area by being attracted to the first electrode 5a (FIG. 1(b)), the reflection layer 4 is blocked by the charged particles 3, so that the color of the charged particles 3 is visually identified as the color of pixel A.

When the charged particles 3 are attracted to the second electrode 5b, the charged particles 3 are moved toward the second electrode 5b along an electric field created between the first electrode 5a and the second electrode 5b. This movement is ordinarily completed on the surface of the second electrode but the charged particles 3 are stopped on a surface of another dielectric layer if there is another dielectric layer in a direction of movement of the charged particles 3. This is also true for the case of the movement of the charged particles 3 to the first electrode 5a.

In the present invention, the stop position of the charged particles 3 is on a surface other than the reflection layer. In other words, electric line of force does not intersect with the reflection layer. In this case, an electrostatic capacity created by the first and second electrodes does not depend on the thickness of the reflection layer. The reflection layer must have a sufficient thickness because incident light is scattered and reflected in the reflection layer. In the present invention, the thickness of the reflection layer can be arbitrarily set.

As described above, the electrophoretic display apparatus according to the present invention, a display color of each pixel is controlled on the basis of movement of the charged particles 3 toward the first electrode 5a side or the second electrode 5b side, whereby various pieces of information are displayed by the entire electrophoretic display apparatus.

The second electrode 5b is disposed with respect to the first electrode 5a so that both of a position of the charged particles 3 after being moved to the first electrode 5a and a position of the charged particles 3 after being moved to the second electrode 5b are substantially apart from the surface of the reflection layer. In other words, the reflection layer is disposed so as not to be located between the first electrode 5a and the second electrode 5b.

When the first and second electrodes 5a and 5b are disposed so that both of the positions of the charged particles 3 after being moved to the first and second electrodes 5a and 5b are those substantially other than the reflection layer surface, the reflection layer 4 is not sandwiched between the first electrode 5a and the second electrode 5b. Accordingly, there is substantially no voltage loss by the reflection layer 4 in the case where these electrodes 5a and 5b are supplied with a voltage. The first and second electrodes 5a and 5b used in the present invention are in such a positional relationship.

As a result, loss of drive voltage by the reflection layer 4 can be prevented, so that it is possible to suppress a voltage applied to these electrodes at a low level. Consequently, low voltage drive can be realized. Further, the loss of such a drive voltage is not caused, so that it is possible to improve a display quality in a bright state by providing a thick reflection layer.

As described above, both of the positions of the charged particles after being moved to the first and second electrodes are substantially apart from the reflection layer surface. However, in some cases, the charged particles 3 overlap each other when they are collected on the second electrode 5b side, so that the charged particles are not located at the second electrode 5b surface or on the electric line of force directed to the second electrode 5b surface in some cases. In such cases, some of the charged particles 3 can be partially located on the reflection layer surface. However, in the present invention, the term "substantially" covers such a state so long as such a state provides a display state which is not different from that in the case where no charged particles 3 are located on the reflection layer surface. In the present invention, the electrophoretic display apparatus may have such a structure that almost all the charged particles 3 are substantially collected on a surface other than the reflection layer surface.

Incidentally, herein a dispersion comprising the dispersion medium 2 and the charged particles 3 dispersed in the dispersion medium 2 is referred to as a "dispersion liquid" as appropriate.

The electrophoretic display apparatus according to the present invention is of a so-called reflection type, so that the first substrate 1a and the first electrode 5a which are disposed on a viewer (observer) side are required to permit light transmission (as described in detail later). On the other hand, the second substrate 1b and the second electrode 5b may be non-light transmissive.

As the reflection layer 4 described above, it is possible to use a white scattering layer disposed along the second substrate 1b. The reflection layer 4 may be disposed in a relatively broad area at each pixel, i.e., on an inner surface (close to the dispersion medium 2) of the second substrate 1b.

The above described first electrode 5a may be disposed along the first substrate 1a in a relatively broad area at each pixel, i.e., on an inner surface (close to the dispersion medium 2) of the first substrate 1a.

Between adjacent pixels, a partition wall 6 may be disposed so as to partition the spacing between the first and second substrates 1a and 1b to define one pixel (minimum pixel unit) or the spacing between the substrates. The partition wall 6 shown in FIG. 1 has a rectangular sectional shape but may have other shapes including a trapezoidal shape and a shape having a curved side surface.

Figure 3:
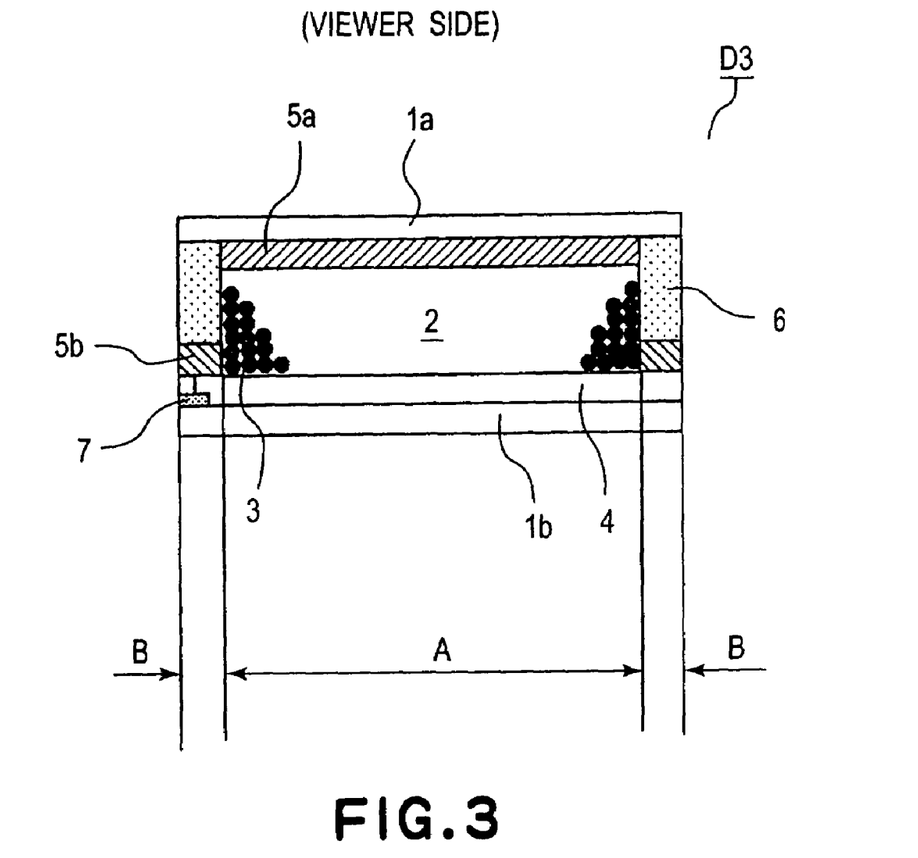
Figure 5:
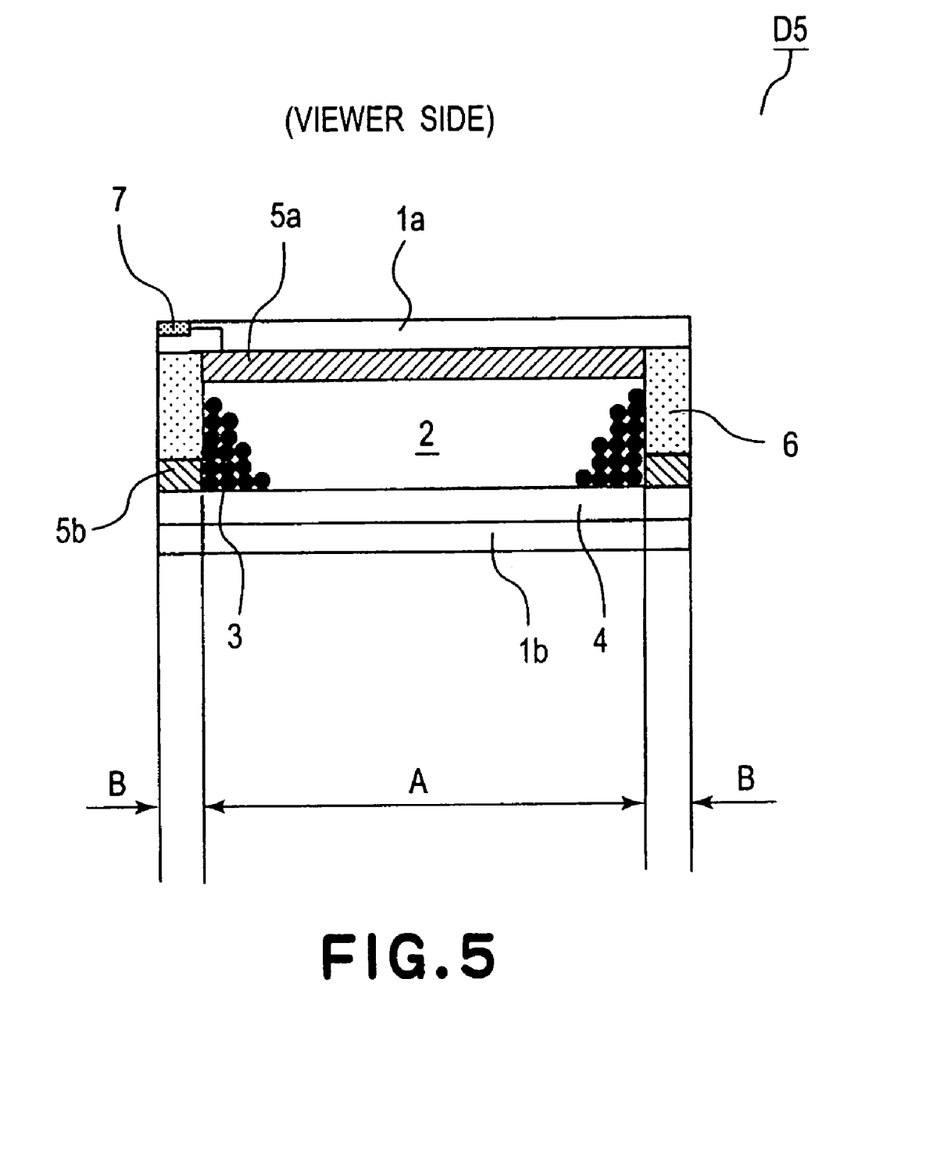

The electrophoretic display apparatus of the present invention effects display by utilizing a state wherein the charged particles 3 are dispersed in a broad area and a state wherein the charged particles 3 are collected in a narrow area, as described above, thus being applicable to a so-called horizontal movement type structure. In the electrophoretic display apparatus D1 shown in FIG. 1, the second electrode 5b is disposed on the first substrate 1a side (i.e., along the inner surface of the first substrate 1a similarly as the first electrode 5a) but may be disposed in another position if the charged particles 3 can be collected in a narrow area. For example, the second electrode 5b may be supported by the partition wall 6 in such a manner that the second electrode 5b is formed within or on the side surface of the partition wall 6. Further, as shown in FIGS. 3 and 5, it is possible to dispose the second electrode 5b in a position where the second electrode 5b is not covered with the reflection layer 4.

It is preferable that the second electrode 5b at each pixel is in a mutually isolated state so as to be supplied with a different voltage, i.e., used as pixel electrode, and the first electrode 5a at each pixel is in an electrical conduction state so as to be supplied with a common voltage, i.e., used as a common electrode. Further, to the second electrode 5b at each pixel, as shown in FIG. 2, a voltage may be applied through a switching device 7.

On the other hand, the first and second electrodes 5a and 5b may also be designed so that the first electrode 5a at each pixel is in a mutually isolated state so as to be supplied with a different voltage, i.e., used as pixel electrode, and the second electrode 5b at each pixel is in an electrical conduction state so as to be supplied with a common voltage, i.e., used as a common electrode. Further, to the first electrode 5a at each pixel, as shown in FIG. 4, a voltage may be applied through a switching device 7.

Figure 2:
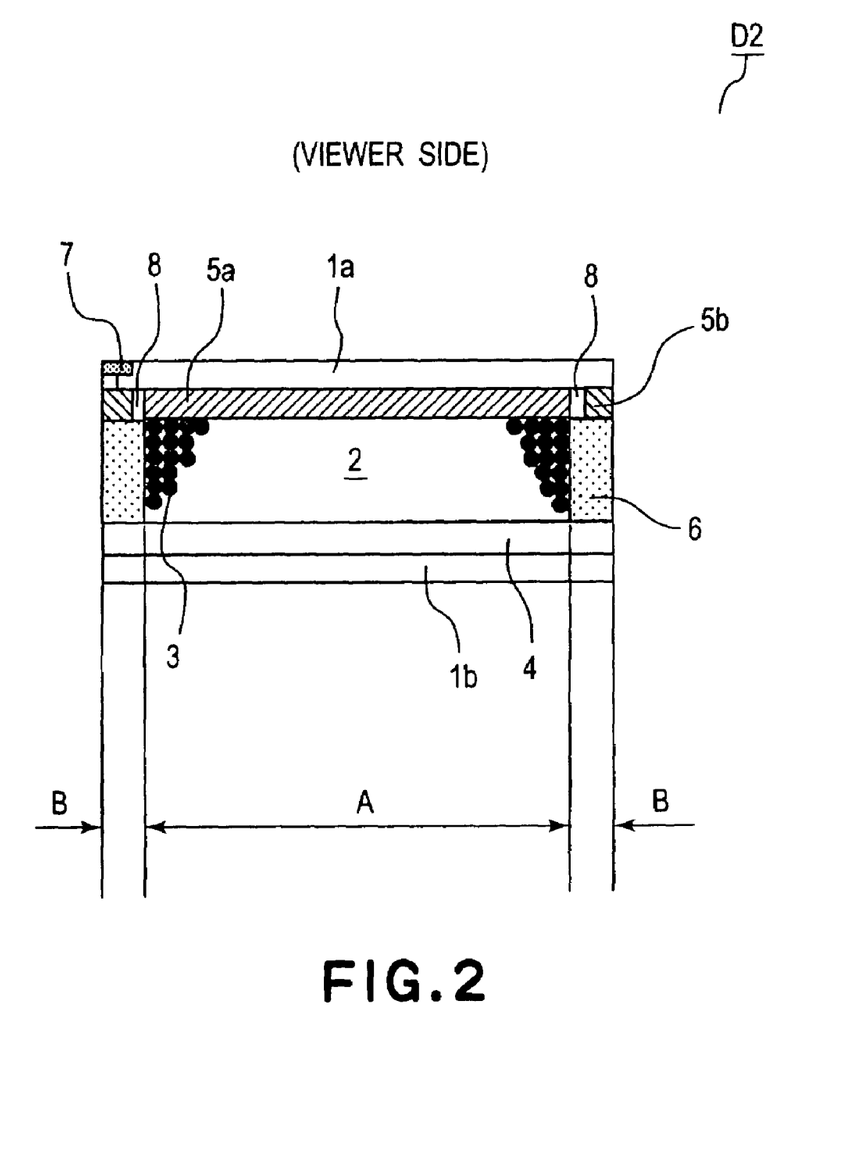
FIGS. 2 to 5 are respectively a sectional view showing another embodiment of a structure of an electrophoretic display apparatus according to the present invention.
Figure 4:
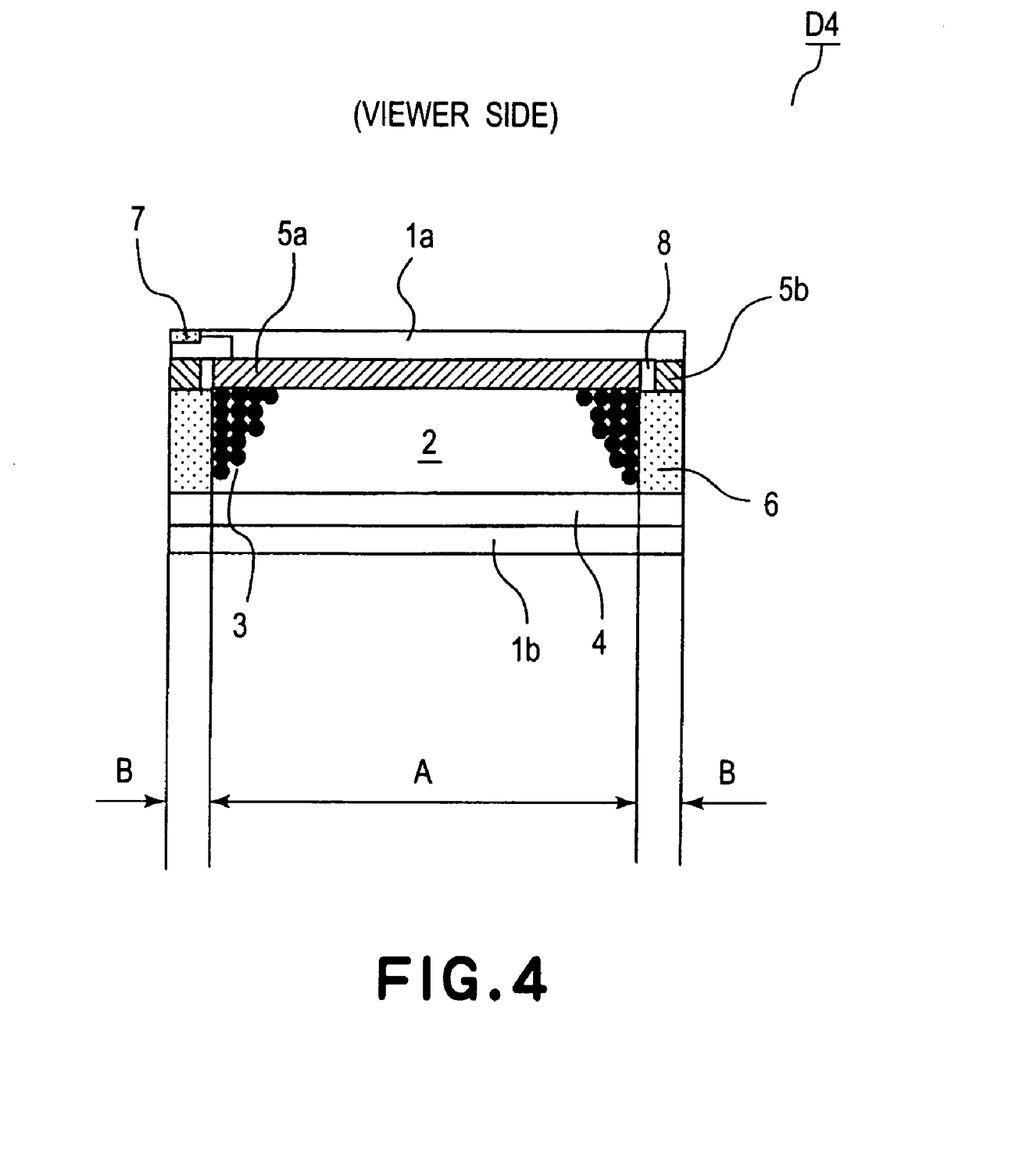

The above described switching device 7 may preferably be disposed at a boundary portion B between adjacent pixels in the case where it is disposed on the first substrate 1a side as shown in FIGS. 2 and 4. By doing so, it is possible to prevent a lowering in aperture ratio.

Figure 1:
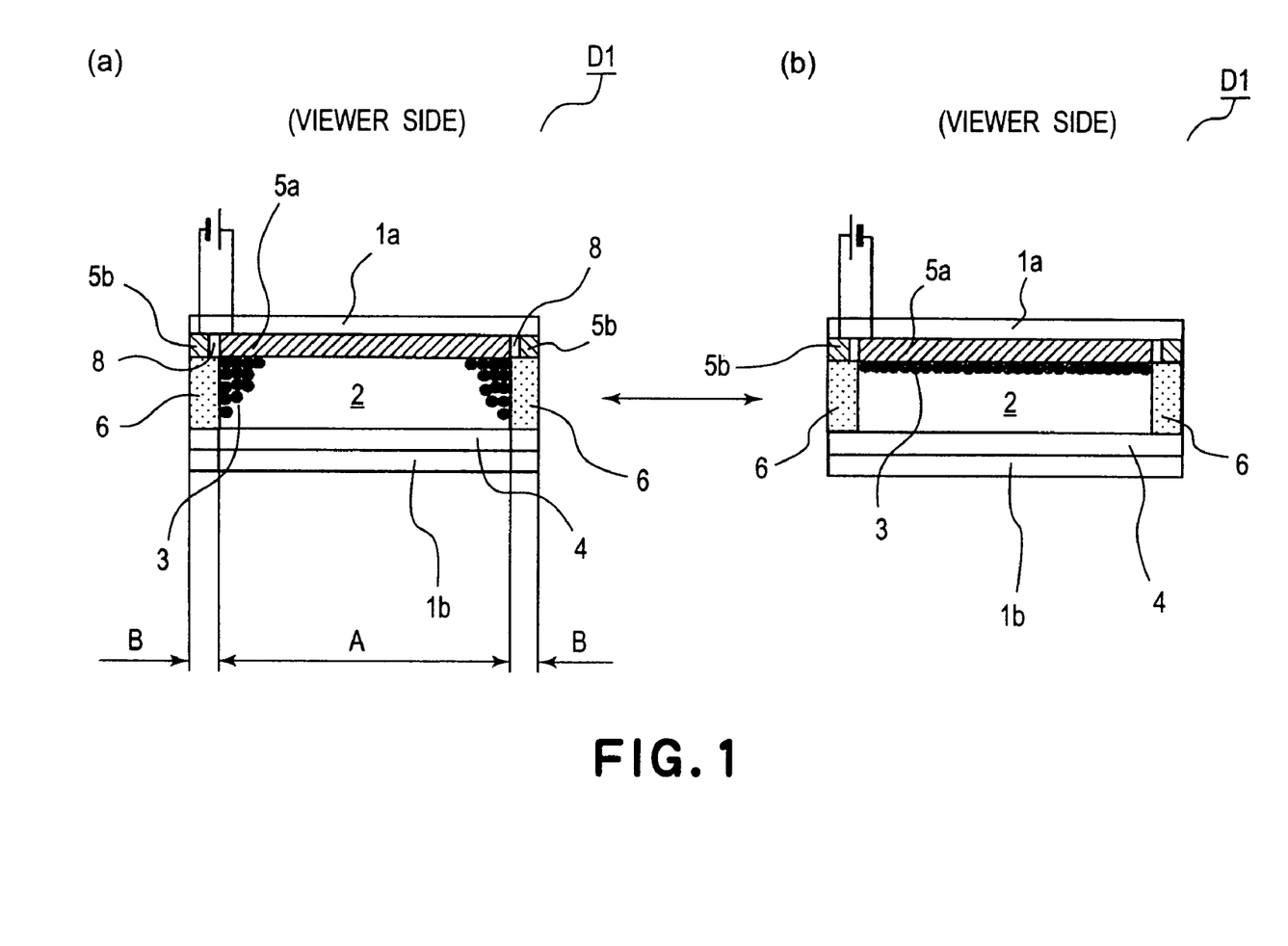
FIGS. 1(a) and 1(b) are respectively a sectional view showing an embodiment of a structure of an electrophoretic display apparatus according to the present invention.

In the electrophoretic display apparatus of the present invention, it is necessary to ensure an electrical insulation between the first electrode 5a and the second electrode 5b at each pixel and also between the adjacent pixel electrodes (the first electrode 5a shown in FIG. 4 or the second electrode 5b shown in FIG. 2) at adjacent pixels. For that purpose, the electrodes may preferably be disposed apart from each other or an insulating layer 8 (as shown in FIG. 1) is disposed between the electrodes. For example, as shown in FIG. 1, in the case where the first electrode 5a and the second electrode 5b are disposed on the same surface, the insulating layer 8 is disposed between the first and second electrodes 5a and 5b. Further, it is also possible to dispose the first electrode 5a and the second electrode 5b in such a manner that these electrodes 5a and 5b are not disposed on the same surface but disposed apart from each other in a direction of thickness of the substrates (as shown in FIGS. 3 and 5). In such a case, the partition wall 6 may be formed of an insulating material so as to also function as the insulating layer.

In the present invention, it is also possible to effect color display by disposing a color filter so as to cover the reflection layer 4 at each pixel.

The electrophoretic display apparatus according to the present invention may also have a structure including: a first substrate 1a and a second substrate 1b; a partition wall 6 which divides a spacing between the substrates 1a and 1b into a plurality of minimum pixel units and defines a thickness (dimension) of the spacing; and a dispersion medium 2, into which charged particles 3 are dispersed, filled in a space defined by the substrates 1a and 1b and the partition wall 6. The first substrate 1a is a transparent substrate. The electrophoretic display apparatus further includes a transparent first electrode 5a on a surface of the first substrate 1a opposite to the second substrate 1b, a reflection layer 4 on a surface of the second substrate 1b opposite to the first substrate 1a, and a second electrode 5b at least a part of which is formed in the partition wall 6.

Hereinbelow, the respective structural members or means of the electrophoretic display apparatus of the present invention will be described more specifically.

A material for the first substrate 1a is not particularly limited so long as it has a high transparency. For example, it is possible to use an inorganic material, such as glass or quartz or an organic material such as a polymer film. The second substrate 1b is not particularly required to have a high transparency. The second substrate 1b may be formed with a stainless steel substrate having an insulating layer at its surface.

A material for the first electrode 5a is not particularly limited so long as it is light-transmissive electroconductive material, and, e.g., indium tin oxide (ITO) may suitably be used therefor. Further, a material for the second electrode 5b is not particularly limited so long as it is an electroconductive material which can be patterned, and, e.g., ITO, aluminum or titanium may suitably used therefor.

A material for the insulating layer 8 may preferably be a thin film which is less liable to cause a pinhole. Examples thereof may include high transmissive resins, such as polyimide, polyester, polyacrylate, polymethacrylate, polycarbonate, polyalylate, novolac resin, and epoxy resin.

As a material for the partition wall 6, it is possible to use polymers or resins, such as polyimide, polyester, polyacrylate, polymethacrylate, polycarbonate, polyalylate, novolac resin, and epoxy resin.

As a method of forming the partition wall 6, it is possible to use, e.g., a method wherein a photosensitive resin layer is formed by application and then is subjected to exposure to light and wet development, a printing method, a method wherein a partition wall is separately formed and then is bonded to a substrate, and a method wherein a partition wall is formed on the surface of a light-transmissive substrate through molding.

The reflection layer 4 used in the present invention may be formed with a material comprising fine particles of a high reflective material dispersed in a transparent insulating resin. Examples of the fine particles may preferably include particles of titanium oxide ($TiO_2$) or aluminum oxide ($Al_2O_3$). As the transparent resin, it is possible to use acrylic resin, urethane resin, fluorine-containing resin, norbornene resin, polycarbonate (PC), and polyethylene terephthalate (PET). Particularly, a combination of titanium oxide particles and urethane resin may suitably be used.

The charged particles 3 used in the present invention is not dissolved in a solvent used but can be dispersed in the solvent. The charged particles 3 may comprise an inorganic colored material, an organic pigment, a polymeric material, and a mixture thereof, and is not particularly limited so long as they function as charged particles as described above within the scope of the present invention. The charged particles 3 can be colored appropriately depending on a display method (mode) of the electrophoretic display apparatus used.

As a specific example of the charged particles 3, it is possible to use commercially available particles, such as micropearl (mfd. by Sekisui Kagaku Kogyo K. K.), Natocospacer (glanular fine particle) (mfd. by Natoco K. K.), epocolor Particle (mfd. by Nippon Shokubai Kagaku Kogyo K. K.), chemisnow (mfd. by Soken Kagaku K. K.), tospearl (m.fd. by GE Toshiba Silicone K. K.), and techpolymer (Sekisui Kaseihin Kogyo K. K.). The charged particles 3 are not particularly limited thereto.

The charged particles 3 used in the present invention may preferably have an average particle size of not less than 0.1 μm and not more than 5 μm. In the present invention, it is possible to classify the charged particles 3 through a known classification method, such as wet classification or dry classification, as desired.

As the dispersion medium 2, it is possible to use an organic solvent which has a low electro-conductivity and a high insulating property. Examples thereof may include aromatic hydrocarbon solvents, such as benzene, ethylbenzene, dodecylbenzene, toluene, xylene, and naphthene-based hydrocarbon; aliphatic hydrocarbon solvents; halogenated hydrocarbon solvents, such as trichlorotrifluoroethylene and ethyl bromide; silicone oil; and high-purity petroleum. Of these organic solvents, the aliphatic hydrocarbon solvents may preferably be used. Specific example thereof may include: Isoper G, H, M, L (mfd. by Exxon Corp.); Shellsol (mfd. by Showa Shell Japan K. K.); and IP solvent 1016, 1620, 2028, 2835 (mfd. by Idemitsu Sekiyu Kagaku K. K.). These may be used singly or in mixture of two or more species.

The dispersion medium 2 may be colored a color different from the color of the charged particles 3 depending on a display method (mode) of the electrophoretic display apparatus used. A material for a coloring agent for that purpose is not particularly limited so long as it is an oil-soluble dye which is soluble in the dispersion medium 2.

In the dispersion liquid used in the electrophoretic display apparatus of the present invention, it is possible to add a rosin ester or a resin derivative for the purpose of enhancing an amount of charge of the charged particles 3 or imparting a charge stability. The rosin ester or rosin derivative is not particularly limited so long as it is soluble in the dispersion medium 2. Examples thereof may include: gum rosin, wood rosin, tall oil rosin, rosin-modified maleic acid, rosin-modified pentaerythritol, rosin glycerinate, partially hydrogenated rosin methylate, partially hydrogenated rosin glycerinate, partially hydrogenated rosin triethyleneglycol ester, completely hydrogenated rosin pentaerythritol ester, maleic acid-modified rosin ester, fumaric acid-modified pentaerythritol ester, acrylic acid-modified rosin glycerinate, maleic acid-modified rosin glycerinate, fumaric acid-modified rosin glycerinate, and acrylic acid-modified rosin glycerinate. In the present invention, these charge control or stabilizing agents may be used singly or in mixture of two or more species.

In the dispersion liquid, it is also possible to add an additive, such as a charge control agent or a dissociation stabilizer, other than the above described dispersion stabilizer, for the purpose of enhancing an amount of charge of the charged particles 3 or imparting a charge stability. Specific examples thereof may include metallic soaps, such as cobalt naphthenate, zirconium naphthenate, copper phthenate, iron naphthenate, lead naphthenate, manganese naphtherate, zinc naphthenate, cobalt octenate, zirconium octenate, iron octenate, lead octenate, nickel octenate, manganese octenate, and zinc octenate.

Next, effects of this embodiment will be described.

According to this embodiment, the electrophoretic display apparatus is designed so that the reflection layer 4 is not substantially located between the first electrode 5a and the second electrode 5b. As a result, loss of drive voltage by the reflection layer 4 can be prevented to suppress a voltage applied to the electrodes 5a and 5b at a low level. Accordingly, it is possible to realize a low voltage drive. Further, there is no loss of drive voltage, so that it is possible to improve a display quality in a bright state by providing a thick reflection layer 4.

Hereinbelow, the present invention will be described more specifically based on Examples with reference to FIGS. 2 to 6.

In the following Examples 1–4 and Comparative Examples 1 and 2, a particle dispersion liquid comprising an insulating liquid (dispersion medium) 2 principally comprising a paraffin-based hydrocarbon solvent and black charged particles 3 of an acrylic resin-coated carbon black dispersed in the dispersion medium 2, was used.

In the following Examples and Comparative Examples, a maximum reflectance (%) in a bright state was measured by taking a reflectance with respect to white light of a barium sulfate ($BaSO_4$) standard white scatterer as 100%.

EXAMPLE 1

An electrophoretic display apparatus D2 shown in FIG. 2 was prepared.

Referring to FIG. 2, on a surface of a transparent substrate (first substrate) 1a, a transparent electrode (first electrode) 5a is formed. The transparent electrode 5a has an area substantially corresponding to an area (90 μm-pitch square area) of pixel A defined by a partition wall 6, and is formed of a transparent ITO.

An opposite electrode (second electrode) 5b is disposed to surround an associated transparent electrode 5a through an insulating layer 8. The opposite electrode 5b is formed of aluminum in a 5 μm width. A 10 μm-wide partition wall 6 is formed so as to cover the respective opposite electrodes 5b. The partition wall 6 has a height of 10 μm and is formed of epoxy resin. The partition wall 6 also has a function of defining a space in which a dispersion liquid is disposed. To the opposite electrode 5b, a thin film transistor (TFT) (switching device) 7 is connected. An active drive is effected between the opposite electrode 5b and the transparent electrode 5a. On an opposite substrate (second substrate) 1b, a white scattering layer (reflection layer) 4 is disposed. The reflection layer 4 is formed in a thickness of 50 μm by dispersing titanium oxide particles (average particle size: 0.5 μm) in an urethane resin.

A surface of the transparent electrode 5a and the partition wall 6 is coated with a transparent film of acrylic resin (not shown).

The electrophoretic display apparatus D2 was prepared as follows.

On the opposite substrate 1b, the white scattering layer 4 was formed. On the surface of the white scattering layer 4, the partition wall 6 was formed to define a recess portion, in which the particle dispersion liquid was filled. On the other hand, on the surface of the transparent substrate 1a, the transparent electrode 5a, the opposite electrode 5b, the TFT 7, and the insulating layer 8 were formed or provided. The substrate 1a and 1b were bonded to each other with a UV curable adhesive (not shown) to seal the dispersion liquid.

The thus prepared electrophoretic display apparatus was subjected to white/black display by applying a voltage between the transparent electrode 5a and the opposite electrode 5b. By appropriately adjusting a magnetite of a voltage signal applied to the electrodes 5a and 5b and an application time, it is possible to effect gradational display.

As a result, a maximum drive voltage was ±10.1 V and a maximum reflectance in a bright state was 68%.

EXAMPLE 2

An electrophoretic display apparatus D3 shown in FIG. 3 was prepared and driven in the same manner as in Example 1 except that a 10 μm-wide opposite electrode 5b and a TFT 7 were not formed on the transparent substrate 1a side but formed on the opposite substrate (second substrate) 1b side so that the opposite electrode 5b was located on an upper surface of the white scattering layer 4 and was not covered therewith, and that the insulating layer 8 was not used.

As a result, a maximum drive voltage (required for display) was ±9.7 V, and a maximum reflectance in a bright state was 66%.

EXAMPLE 3

An electrophoretic display apparatus D4 shown in FIG. 4 was prepared and driven in the same manner as in Example 1 except that the opposite electrode 5b, not the transparent electrode 5a, was used as a common electrode, and the TFT 7 was connected to the transparent electrode 5a.

As a result, a maximum drive voltage (required for display) was ±9.8 V, and a maximum reflectance in a bright state was 68%.

EXAMPLE 4

An electrophoretic display apparatus. D5 shown in FIG. 5 was prepared and driven in the same manner as in Example 2 except that the opposite electrode 5b, not the transparent electrode 5a, was used as a common electrode, and the TFT 7 was connected to the transparent electrode 5a.

As a result, a maximum drive voltage (required for display) was ±9.3 V, and a maximum reflectance in a bright state was 66%.

COMPARATIVE EXAMPLE 1

An electrophoretic display apparatus D6 shown in FIG. 6 wherein a pixel electrode 15a and an opposite electrode 15b were formed on a surface of an opposite substrate 1b and an insulating layer 8 was disposed between the electrodes 15a and 15b, was prepared in the following manner.

On the opposite substrate 1b, the pixel electrode 15a identical in size and material to the transparent electrode 5a used in Example 1 was formed, and the opposite electrode 15b was formed of aluminum in a width of 5 μm. The opposite electrode 15b was used as a common electrode, and a TFT 7 was connected to each pixel electrode 15a. A white scattering layer 4 identical in material and thickness to that used in Example 1 was formed to cover the electrodes 15a and 15b and the insulating layer 8. At a pixel boundary portion B (where the opposite electrode 15b and the insulating layer 8 were formed), a partition wall 6 identical in material and size to that used in Example 1 was disposed to define a recess portion.

In the recess portion, a dispersion liquid identical to that used in Example 1 was filled.

The transparent substrate 1a and the opposite substrate 1b were bonded to each other with a UV curable adhesive to seal the dispersion liquid.

The thus prepared electrophoretic display apparatus D5 was driven in the same manner as in Example 1.

As a result, a maximum drive voltage (required for display) was not less than +60 V, and a maximum reflectance in a bright state at the time of applying a voltage of +60 V to the pixel electrode 15a was 40%.

COMPARATIVE EXAMPLE 2

An electrophoretic display apparatus was prepared and driven in the same manner as in Comparative Example 1 except that the thickness (50 μm) of the white scattering layer 4 was changed to 5 μm.

As a result, a maximum drive voltage (required for display) was ±22 V, and a maximum reflectance in a bright state was 22%.

What is claimed is:

1. An apparatus, comprising:
   a transparent film substrate and a second substrate which are disposed opposite to each other with a spacing therebetween;
   a plurality of charged particles which are disposed in the spacing;
   a reflection layer disposed on said second substrate, said reflection layer having a thickness sufficient to scatter light transmitted through said first substrate and reflect the light toward said first substrate; and
   a first electrode and a second electrode for dispersing said charged particles in a broader area and collecting said charged particles in a narrower area by applying a voltage between said first and second electrodes,
   wherein said reflection layer is formed with a material comprising light-reflective particles dispersed in a transparent insulating resin.

2. The apparatus according to claim 1, wherein said light-reflective particles include particles of titanium oxide or aluminum oxide.

3. The apparatus according to claim 1, wherein said transparent insulating resin is one of acrylic resin, urethane resin, fluorine-containing resin, norbornene resin, polycarbonate, and polyethylene terephthalate.

4. The apparatus according to claim 1, wherein said thickness of the reflection layer is 50 μm or larger.

* * * * *